United States Patent [19]

Reinert et al.

[11] 4,087,240

[45] May 2, 1978

[54] STABLE FORMULATIONS OF TEXTILE-PROCESSING AGENTS

[75] Inventors: Gerhard Reinert, Allschwil; Frank Lohmann, Arlesheim; Paul Dussy, Basel, all of Switzerland

[73] Assignee: Ciba-Geigy Corporation, Ardsley, N.Y.

[21] Appl. No.: 696,465

[22] Filed: Jun. 15, 1976

Related U.S. Application Data

[63] Continuation of Ser. No. 540,369, Jan. 13, 1975, abandoned.

[30] Foreign Application Priority Data

Jan. 22, 1974 Switzerland .......................... 865/74

[51] Int. Cl.$^2$ ............................................. D06L 3/12
[52] U.S. Cl. ................................... 8/1 W; 8/91; 8/94 A; 252/86; 252/301.21; 252/301.34
[58] Field of Search ............... 8/91, 93, 173, 94 A; 252/301 AT

[56] References Cited

U.S. PATENT DOCUMENTS

| | | | |
|---|---|---|---|
| 3,079,303 | 2/1963 | Rath | 424/35 |
| 3,194,735 | 7/1965 | Brechner | 8/10 |
| 3,254,046 | 5/1966 | Mazzolini | 8/1 W |
| 3,637,520 | 1/1972 | Schweiger | 252/316 |
| 3,787,180 | 1/1974 | Wegmuller | 8/172 |
| 3,900,286 | 8/1975 | Wegmann | 8/172 |

FOREIGN PATENT DOCUMENTS

| | | | |
|---|---|---|---|
| 2,041,023 | 2/1971 | Germany | 8/173 |
| 2,227,784 | 1/1973 | Germany | 8/173 |
| 1,299,453 | 12/1972 | United Kingdom | 8/173 |

OTHER PUBLICATIONS

Kreis, Melliand Text, Ber., vol. 10, pp. 468–469, 1929.
Fonda J. Opt. Soc. of America, 8/1936.
Tupholme, Textile Colorist, Jul., 1938, vol. 60, No. 715, pp. 441–442.
Soap & Sanitary Chemicals, vol. 30, No. 1, Jan. 1954, pp. 85, 87, 89.
Walner, Abstract in J. Soc. Dyers & Col., Jun. 1953, p. 223.
Ott, Cellulose, Part II, 755–760, Interscience, Pub. 1954.

Primary Examiner—Donald Levy
Attorney, Agent, or Firm—Edward McC. Roberts; Prabodh I. Almaula

[57] ABSTRACT

Textile-finishing-agent formulations which are stable in halogenated hydrocarbons, which formulations contain
(a) 5 to 80 per cent by weight of at least one textile-processing agent,
(b) 15 to 90 per cent by weight of a halogenated hydrocarbon,
(c) 5 to 40 per cent by weight of a humectant, and
(d) 0.3 to 8 per cent by weight of a thickening agent.

7 Claims, No Drawings

STABLE FORMULATIONS OF TEXTILE-PROCESSING AGENTS

This is a continuation of application Ser. No. 540,369, filed on Jan. 13, 1975 now abandoned.

The invention relates to new textile-finishing-agent formulations which are stable in halogenated hydrocarbons, to the use thereof for the preparation of organic liquors for the processing of materials, as well as to the material processed with these formulations.

Formulations of textile-finishing agents, such as those of optical brighteners and dyestuffs, in solid or liquid form are known. These formulations are designed for a specific commercial form of the textile-processing agent with regard to the subsequent purpose for which this commercial product is to be used. On the one hand, the formulations hitherto known for use in aqueous liquors are unsuitable in an organic liquor and, on the other hand, the formulations hitherto known for use in organic liquors sometimes contain ballast substances, such as "foreign solvents", which have a disadvantageous effect, for example, in an organic continuous textile-finishing process, particularly in the case of the recovery of the real solvent, e.g., perchloroethylene.

There was therefore a need, especially with regard to the employment of, in particular, continuously operating machines for processing materials, which machines operate specifically with solvents, to acquire formulations which can be used without problems in these specifically solvent-using machines, which constitute commercial formulations having a low content of ballast substances, and which contain no solvents harmful to the machines, so that operating with such formulations is without risk to machine and to substrate, is environmentally more favourable and, moreover, is less expensive.

These formulations should hence be in a commercial form which, besides satisfying requirements such as good handling properties and good stability in storage, satisfies other conditions, especially with regard to continuous processes of application: they must contain, for example, no additives and solvents which can disturb the regeneration system with concentrations of azeotrope-forming, decomposable, explosive, inflammable or corrosive substances. The products must also be so formulated that the regeneration system of the machine does not become contaminated with chemicals, solvents, etc. which can no longer be removed from the solvent-circulation system, or which act in a manner rendering the basic solvent unstable or in such a way that the content of, for example, perchloroethylene in the waste liquor increases. Accordingly, formulation additives to be excluded are: low-boiling alcohols, carboxylic acids, carboxylic acid esters and carboxylic acid amides, aliphatic and aromatic hydrocarbons, and also chlorinated hydrocarbons, which are not employed in the regeneration system of the machines. On the other hand, the formulations however must not contain products which remain on the fibre material, which are toxic, or which act in such a way as to damage the fibres, increase soiling, heighten inflammability, impair fastness properties, and so forth. Furthermore, they must not produce in subsequent stages of the processes undesirable effects, such as the formation of smoke or of condensation drops during heat treatment of the materials, or render the materials hydrophobic, or unfavourable affect the sharpness of printing in the subsequent printing process, etc. The formulation additives must also not create difficulties when the treatment liquors are distilled; for example, they must not decompose to form poisonous, corrosive, explosive products.

DOS 2,256,598, for example, describes dyestuff preparations which contain a finely ground disperse dyestuff, a low-polymeric compound soluble in a halogenated hydrocarbon, and an inert, nonvolatile, organic compound. These preparations would, by virtue of their content of nonvolatile organic compounds such as paraffin oil, hard paraffin or beeswax, not satisfy, e.g., the aforementioned criteria, since they would produce on the material undesirable effects, e.g. water-repellent effects, or they would unfavourable affect inflammability and the antisoil properties and soil-release properties of the textile materials. These products are moreover to be unfavourably assessed from the point of view of operational safety, since they form, for example, explosive mixtures with air.

From DOS 2,041,023; 2,041,024 and 2,041,033, there are also known preparations for the dyeing or treatment of polymeric materials in organic solvents, such as, e.g., perchloroethylene. These consist of stable deflocculated dispersions of ground dyestuff or treatment agent and a deflocculating agent, e.g. polyurea. These preparations, however, do not possess the property of redispersibility after having been dried out; in addition, polyureas are soluble only to a limited extent in perchloroethylene, so that the additional use of auxiliary solvents, for example, butylacetate, among others, is necessary. However, solvents of this kind are risky from the point of view of operational safety.

There have now been developed for textile-processing agents new liquid formulations which satisfy the aforementioned criteria, and which are excellently suitable for the continuous application from organic solvents, especially from perchloroethylene.

These new formulations of textile-processing agents are stable and liquid and contain:
(a) 5 to 80 percent by weight of a textile-processing agent,
(b) 15 to 90 percent by weight of a halogenated hydrocarbon,
(c) 5 to 40 percent by weight of a humectant, and
(d) 0.3 to 8 percent by weight of a thickening agent.

In these formulations, the textile-processing agents according to (a) are, in particular, optical brighteners, finishing products and dyestuffs. The optical brighteners can belong to the most varied chemical classes. They are, for example, derivatives of diaminostilbenedisulphonic acid, distyryl-4,4-diphenyl, benzidine, benzimidazole, dibenzimidazole, or diphenylimidazolone, derivatives of 4-alkoxy- or 4,5-dialkoxy-1,8-naphthalimide, derivatives of oxazole (preferably benzoxazole), oxacyanine and 1,3-diphenyl pyrazoline as well as coumarines (preferably 3,7-substituted types such as, e.g., 3-phenyl-7-substituted coumarins or 4-methyl-7-dialkylaminocoumarins).

The widest range of products are suitable as finishing products; e.g. delustring agents in the form of inorganic pigments based on titanium dioxide or silicon dioxide; also fungistatics, bactericides, water-repellent agents, sizing, antistatic agents, finishing agents for improving handle and agents producing a soft handle.

The dyestuffs used can belong to the most diverse colouristic classes, such as, for example, acid dyestuffs, cationic dyestuffs, direct dyestuffs, disperse dyestuffs, reactive dyestuffs and vat dyestuffs.

The halogenated, preferably aliphatic, hydrocarbons employed according to (b) are primarily hydrocarbons which are used as the liquor medium in textile processing. They are, in particular, chlorinated aliphatic hydrocarbons such as trichloroethylene, 1,1,1-trichloroethane and, above all, tetrachloroethylene (perchloroethylene), as well as mixed-halogenated hydrocarbons such as, e.g., 1,1,2-trifluoro-2,2,1-trichloroethane (Frigen 113).

The humectants according to constituent (c) serve to prevent the surface drying of the preparation, so that crusts at the edges can be taken back into the preparation. These humectants should moreover be soluble in the hydrocarbon according to (b) and should be high-boiling; they should have a vapour-pressure lowering effect on the formulation, should not form an azeotrope with the hydrocarbon according to (b) and should not affect, in the applied concentration, the textile substrate — even where subsequent working operations are involved. As substances having these properties, there may be mentioned, in particular: glycols such as 2-methyl-2,4-pentanediol; phthalic acid esters such as dimethyl ester, dibutyl ester and dicyclohexyl ester; ethoxylated alkylphenyl derivatives such as 4-nonylphenol . 9 or 35 ethylene oxide; ethoxylated fatty alcohols such as stearyl alcohol . 35 ethylene oxide; alkylated urea derivatives such as tetramethylurea; block polymers of ethylene and propylene oxide, such as those known under the trade name of Pluronic ®, whereby, in particular, the "L" and "P" types, which are readily soluble in halogenated aliphatic hydrocarbons, are suitable, such as L 44, L 72 and L 121; polyoxyalkylene derivatives of ethylenediamine, which are known under the name of Tetronic, for example, Tetronic 1101, 1102, 1501 or 1502; polypropylene glycols and polypropylene oxide derivatives of compounds reacting with propylene oxide, such as, e.g. glycerin, pentaerythrite and trimethylpropane.

The thickening agents d) usable according to the invention should impart to the formulation storage stability, should be readily soluble in the hydrocarbons according to b), and even in small amounts should have a viscosity-increasing effect. Suitable examples are, e.g., linear and branched chain polymers of various classes, such as, e.g. cellulose derivatives, such as acylcelluloses having a high degree of acylation, for example acetyl or butyl cellulose, ethyl-celluloses of varying degree of etherification, preferably those with an ethoxyl content of 47 to 55%, and of varying molecular weight, e.g. ethylcellulose types such as are sold commercially, marketed by Hercules (ethylcellulose of the N- or T- types, such as N 22, N 200, T 50 and T 200) or by Dow Chemical Co. (Ethocel ® Standard), as well as preferably ammonium salts of high-molecular cellulose sulphate such as those described in U.S. Pat. No. 3,637,520. The products are available commercially under, inter alia, the trade name "Soloid" [Kelco Co. (USA)]. Also suitable are polyethylenes of suitable molecular weight, such as, e.g. Hoechstwachs ® PAD 521, 522, etc.

Particularly valuable formulations suitable for the continuous application of textile-processing agents contain:
(a) 15 to 40 percent by weight of an optical brightener or dyestuff,
(b) 50 to 70 percent by weight of tetrachloroethylene,
(c) 5 to 15 percent by weight of a humectant, especially 2-methyl-2,4-pentanediol, and
(d) 1 to 2 percent by weight of an ammonium salt of high-molecular cellulose sulphate.

These formulations are produced, for example, by a process in which the textile-processing agent is dissolved, dispersed or emulsified in, e.g., tetrachloroethylene or trichloroethylene; and, for the purpose of reducing evaporation and of avoiding incrustations, there is then added, in the amounts defined, the humectant, as well as a thickening agent for stabilisation of the formulation.

With respect to particle size, the formulations of the products are advantageously adapted to suit the purpose for which they are to be used and to suit the properties of the end products, i.e. in the case of products to be applied in dispersions, finely ground material will be preferred; and in the case of products which go into solution, the aim will be to merely obtain stable dispersions.

The formulations according to the invention, which can thus be in the form of a solution, dispersion or emulsion, or, by substantial removal of the halogenated hydrocarbon, also in the form of a paste, are characterised by very good stability in storage over several months in a temperature range of about −5° C to +45° C; they are readily pourable and can be immediately dissolved, dispersed or emulsified without the formation of lumps and streaks.

These formulations are used, in particular, for the preparation of organic, especially tetrachloroethylene, liquors which, in their turn, are employed preferably for the continuous processing of materials, such as, for instance, for the continuous finishing or optical brightening in dry cleaning machines, for the dyeing of textile materials as well as for the preliminary treatment of printing grounds.

The following examples illustrate the invention, without limiting the scope thereof. Temperatures are given in degrees Centigrade.

(A) PREPARATION OF THE FORMULATIONS

EXAMPLE 1

9 g of Soloid (product of Kelco Co. USA) is dissolved, with stirring, in 691 g of perchloroethylene at 40°, whereupon there is a considerable increase in the viscosity of the solution. To this solution there is then added, with good mixing, 100 g of 2-methyl-2,4-pentanediol. An addition is subsequently made to this solution, with thorough stirring, of 200 g of the optical brightener, having a particle size of about 50 μ, of the formula

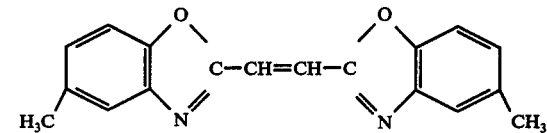

The resulting dispersion is very readily pourable and is stable in storage.

If, instead of 100 g of 2-methyl-2,4-pentanediol, there are used identical amounts of 4-nonylphenol . 35 ethylene oxide, or stearyl alcohol . 35 ethylene oxide, or tetramethylurea, phthalic acid dimethyl ester, phthalic acid dibutyl ester or dicyclohexylphthalate, then likewise there is obtained a liquid dispersion having similarly good properties with respect to stability and application.

EXAMPLE 2

20 g of Ethylcellulose N 200 ® (Hercules) is dissolved, with stirring, in 730 g of perchloroethylene at 40°, whereupon there is a considerable increase in the viscosity of the solution. To this solution there is then added, with good mixing, 100 g of 2-methyl-2,4-pentanediol. An addition is subsequently made to this solution, with thorough stirring, of 150 g of the optical brightener, having a particle size of about 50 μ, of the formula given in Example 1.

The resulting dispersion is very readily pourable and is stable in storage.

If, instead of the optical brightener of the above formula, those given in the following Table 1 are used, with otherwise the same formulations as those given in Examples 1 and 2, are obtained dispersions having very good stability in storage.

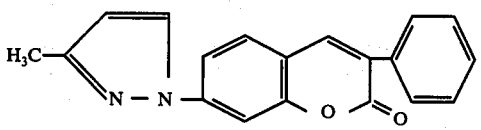

is added with stirring. To the resulting dispersion there is finally added 200 g of glass balls (diameter about 1½ mm), and the whole is shaken in a shaking apparatus, or is ground in a ball mill, until the particle size of the optical brightener is only about 10 μ. After removal of the grinding medium, there is obtained a viscous, readily pourable and storage-stable dispersion.

If, instead of the optical brightener of the above formula, there are used those given in the following Table 2, with otherwise the same formulation procedure, then there are likewise obtained liquid formulations having very good stability in storage.

Table 2

| Ex. No. | Optical brightener |
|---|---|
| 8 | ⟨◯⟩-CH=CH-⟨◯⟩-⟨◯⟩-CH=CH-⟨◯⟩   SO₃Na ............................................. SO₃Na |
| 9 | [CH₃O-⟨furan⟩-⟨benzimidazole⟩-CH₂-C₆H₅]⊕ (CH₃OSO₃)⊖ |
| 10 | [⟨◯⟩-CH=CH-⟨◯⟩-⟨◯⟩-CH=CH-⟨◯⟩]²⊖ [C₁₇H₃₅C(=N)(NH)-H]⊕   SO₃ ............................................. SO₃ |

Table 1

| Ex. No. | Optical brightener |
|---|---|
| 3 | ⟨benzoxazole⟩-C=C(S)-C=C-⟨benzoxazole⟩ |
| 4 | ⟨◯⟩-⟨◯⟩-CH=CH-⟨◯⟩-⟨benzoxazole⟩-C(CH₃)₃ |
| 5 | ⟨◯⟩-⟨◯⟩-CH=CH-⟨◯⟩-⟨benzoxazole-CH₃,CH₃⟩ |
| 6 | Cl-⟨◯⟩-CH=CH-⟨◯(CN)⟩-⟨triazole-naphthalene⟩ |

EXAMPLE 7

10 g of Soloid is dissolved, with stirring, in 790 g of perchloroethylene at 40°. This solution is mixed with 100 g of 2-methyl-2,4-pentanediol, and 100 g of the optical brightener of the formula (particle size ~40 to 60 μ)

EXAMPLE 11

20 g of ethylcellulose characterised by a substitution degree of 2.4 to 2.6 ethoxyl groups per anhydro glucose unit and a 5% solution thereof in a 80:20 mixture of toluol/ethanol having a viscosity of 15 to 250 centipoise, (e.g. ethylcellulose of the types N 22 or T 200 or T 50, Hercules) is dissolved with heating in 730 g of perchloroethylene. 100 g of 2-methyl-2,4-pentanediol as humectant is then stirred into the resulting viscous solution, and subsequently 150 g of the optical brightener according to Example 1 is mixed in with a high-speed stirrer to form a dispersion.

There is obtained a readily pourable and storage-stable formulation, which dissolves in perchloroethylene liquors, at the concentration to be applied, by simply being stirred in.

If, instead of 2-methyl-2,4-pentanediol, there is used in the same amount an addition product of stearyl alcohol with 35 mol of ethylene oxide, an addition product of 4-nonylphenol with 35 mol of ethylene oxide, Pluronic L 44, Pluronic L 72, Pluronic L 121, Tetronic 1101, Tetronic 1102, Tetronic 1501, Tetronic 1502, phthalic acid dibutyl ester or dicyclohexylphthalate, an adduct of propylene oxide and glycerin having a molecular weight of about 450, or an adduct of propylene oxide and pentaerythrite having a molecular weight of about 650, then storage-stable liquids are also obtained.

EXAMPLE 12

300 g of titanium dioxide (quality Anatas Kronos) is stirred into 630 g of perchloroethylene. A dispersion is formed, to which, while continuously intensively dispersing with a dispersing apparatus, e.g. an Ultra-Turrax apparatus, there is slowly added a dispersion of 20 g Ethylcellulose N 200 ® (Hercules) in 50 g of 2-methyl-2,4-pentanediol. After a dispersing time of about 5 minutes, there is obtained a readily pourable, very storage-stable formulation, which can be used for delustring purposes.

EXAMPLE 13

20 g of the dyestuff of the formula

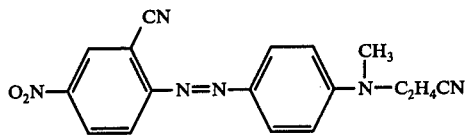

is ground in a mixture of 10 g of 2-methyl-2,4-pentanediol and 68 g of perchloroethylene in a bead-ball mill until the particle size is below 1 μ. After separation of the grinding agent, there is added to the thinly liquid dispersion 2 g of ethylcellulose (N 22, Hercules) as a thickening agent. The resulting 20% dyestuff formulation is of medium viscosity is readily pourable and has good stability. It is suitable for the preparation of dye liquors for dyeing polyester by exhaust and continuous processes form perchloroethylene.

EXAMPLE 14

10 g of ethylcellulose (T 200, Hercules) is dissolved, with heating, in 740 g of perchloroethylene. Into the resulting viscous solution, there is then stirred, by means of a high-speed stirrer, 50 g of 2-methyl-2,4-pentanediol and subsequently 200 g of the optical brightener according to Example 1. 240 g of perchloroethylene is distilled off from the readily pourable dispersion, and by this means there is obtained a viscous paste, which, in concentrations used for application, readily dissolves in perchloroethylene liquors.

EXAMPLE 15

150 g of a low-molecular polyethylene, e.g. Hoechst-wachs ® PAD 522 (dropping point 92°) are dissolved with heating in 795 g of perchloroethylene. Into this solution which has been cooled to about 30°, there are poured with continuous stirring, e.g. with an Ultra-Turrax ®, 50 g of 2-methyl-2,4-pentanediol, containing 5 g of Ethylcellulose T 200 (ethoxyl group content > 49%; Hercules) dispersed therein. After standing for several hours, this formulation is again emulsified by stirring.

A viscous formulation which is still pourable and has good storage stability is obtained which can be employed as softening agent for textile materials.

(B) APPLICATION OF THE FORMULATIONS

EXAMPLE 16

17.5 g of the brightener formulation of Example 1 is dissolved in one litre of perchloroethylene; the formulation is immediately soluble by light stirring. There is then dispersed in this solution 50 g of the delustring agent described in Example 12.

100 g of polyester curtain material is subsequently impregnated with this solution on the padding machine; the material is squeezed out to obtain a squeezing effect of about 100%, dried at 120° in an air-circulation oven, and then thermofixed at 180° with a contact time of 30 seconds, for example, in a continuously operating laboratory thermofixing frame.

An excellently optically brightened and delustred curtain material is obtained.

We claim:
1. A liquid, stable, textile-processing formulation, consisting essentially of
    (a) 5 to 80% by weight of a colorless optical brightener,
    (b) 15 to 90% by weight of a halogenated hydrocarbon solvent,
    (c) 5 to 40% by weight of 2-methyl-2,4-pentanediol, and
    (d) 0.3 to 8% by weight of a thickener selected from the group consisting of acetylcellulose, ethyl cellulose, and ammonium cellulose sulfate.
2. The formulation of claim 1, consisting essentially of
    (a) 15 to 40% by weight of the colorless optical brightener,
    (b) 50 to 70% by weight of a halogenated hydrocarbon solvent,
    (c) 5 to 15% by weight of 2-methyl-2,4-pentanediol, and
    (d) 1 to 2% by weight of an ammonium salt of high-molecular cellulose sulfate.
3. The formulation of claim 2, wherein the halogenated hydrocarbon solvent is a chlorinated aliphatic hydrocarbon solvent.
4. The formulation of claim 3, wherein the solvent is tetrachloroethylene, trichloroethylene or 1,1,1-trichloroethane.
5. The formulation of claim 4, wherein the solvent is tetrachloroethylene.
6. The process of preparing an organic liquor textile-processing bath, comprising the step of adding to the organic liquor a liquid, stable, textile-processing formulation, consisting essentially of
    (a) 5 to 80% by weight of a colorless optical brightener,
    (b) 15 to 90% by weight of a halogenated hydrocarbon solvent,
    (c) 5 to 40% by weight of 2-methyl-2,4-pentanediol, and
    (d) 0.3 to 8% by weight of a thickener selected from the group consisting of acetylcellulose, ethyl cellulose, and ammonium cellulose sulfate.
7. The process of claim 6, wherein the organic liquor is perchloroethylene.

* * * * *